United States Patent
Chen et al.

(10) Patent No.: US 10,530,458 B2
(45) Date of Patent: Jan. 7, 2020

(54) COMMUNICATION METHOD, TERMINAL AND COMMUNICATION SYSTEM

(71) Applicant: ZTE CORPORATION, Guangdong (CN)

(72) Inventors: Xi Chen, Guangdong (CN); Jun Qin, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/772,110

(22) PCT Filed: Jun. 15, 2016

(86) PCT No.: PCT/CN2016/085879
§ 371 (c)(1),
(2) Date: Apr. 30, 2018

(87) PCT Pub. No.: WO2016/197998
PCT Pub. Date: Dec. 15, 2016

(65) Prior Publication Data
US 2018/0316410 A1 Nov. 1, 2018

(30) Foreign Application Priority Data
Oct. 30, 2015 (CN) .......................... 2015 1 0728028

(51) Int. Cl.
*H04B 7/10* (2017.01)
*H04B 7/06* (2006.01)

(52) U.S. Cl.
CPC ............. *H04B 7/10* (2013.01); *H04B 7/0613* (2013.01)

(58) Field of Classification Search
CPC ...... H04B 7/10; H04B 7/0613; H04B 7/0417; H04B 7/669; H04L 1/0618; H04L 1/06; H04L 25/0204
See application file for complete search history.

(56) References Cited

U.S. PATENT DOCUMENTS

| | | | | |
|---|---|---|---|---|
| 7,590,191 | B1 * | 9/2009 | Macrae | H04L 27/04 342/361 |
| 2013/0129014 | A1 * | 5/2013 | Kim | H04B 7/0456 375/295 |
| 2014/0146902 | A1 * | 5/2014 | Liu | H04B 7/0689 375/260 |
| 2015/0162971 | A1 * | 6/2015 | Kobayashi | H01Q 3/24 455/62 |

* cited by examiner

Primary Examiner — Ted M Wang
(74) Attorney, Agent, or Firm — Nath, Goldberg & Meyer; Joshua B. Goldberg

(57) ABSTRACT

Disclosed are a communication method, a terminal and a communication system, which are applied between a terminal and a base station in a line of sight communication environment. A first polarizing antenna having the same polarity as that of a second polarizing antenna of a base station is set on a terminal, wherein the first polarizing antenna includes a first antenna component and a second antenna component having different polarities; and a first signal and a second signal which are sent by the base station via the second polarizing antenna are received via the first polarizing antenna.

13 Claims, 3 Drawing Sheets

COMMUNICATION METHOD, TERMINAL AND COMMUNICATION SYSTEM

This is a National Phase Application filed under 35 U.S.C. 371 as a national stage of PCT/CN2016/085879, filed Jun. 15, 2016, an application claiming the benefit of Chinese Application No. 201510728028.1, filed Oct. 30, 2015, the content of each of which is hereby incorporated by reference in its entirety.

TECHNICAL FIELD

This document relates to, but is not limited to, a field of communication, and in particular, to a communication method, a terminal, and a communication system.

BACKGROUND

In a transmission process, signals are reflected, refracted, and diffracted due to an influence of terrain and features, causing the signals being propagated along different paths. This is called multipath propagation. The multipath propagation makes signals received at the receiving end with different amplitudes, phases, frequencies, and arrival times. That is, multipath signals obtained through the multipath propagation have different fading characteristics. Multiple-input multiple-output (MIMO) technologies in traditional terrestrial wireless communication take advantage of the characteristics that signals will have different fading characteristics due to the influence of terrain and features in a transmission process, and reduce a correlation between receiving antennas at a terminal side by increasing antenna spacing, ensuring that the fading characteristics of the multipath signals received by different antennas are different. Thereby, spatial division multiplexing is realized to improve a downlink throughput. In an ideal case, the distance between the receiving antennas may be any distance which is greater than half the wavelength.

However, the above-mentioned space division multiplexing is no longer applicable in some specific communication environments, such as a light-of-sight communication environment. Between the transmitting end and the receiving end of the signal in the light-of-sight communication environment, there is no obstacle causing a propagation path being changed, and signals arrive at the receiving end in a single path without differences in amplitude, phase, frequency, and arrival time. Therefore, in such an environment, using the method of reducing the correlation between receiving antennas to ensure that the signals are received with different fading characteristics is no longer applicable. In such an environment, of course, conventional methods for the spatial division multiplexing maybe useless.

Typical light-of-sight communication environment is common, and the most typical one may be air-to-ground (ATG) communication. In an ATG system, a flying height for an aircrafts is about 10,000 m, which allows a light-of-sighting communication with a radius about 400 km. Thus, the light-of-sighting communication may be the main form of communication between a base station and an airborne station. In addition to water surfaces, the surfaces are mainly diffuse reflection surfaces in this scenario, thus few reflected, refracted, and diffracted multipath signals may arrive at the airborne station. In other words, the correlation between receiving antennas is strong, and even if the spacing between two antennas of the airborne station is increased to dozens of meters, which is greater than 10 times the wavelength and far exceeds the general requirement of macrocells for terrestrial mobile communication systems (i.e., the distance between receiving antennas should be more than half the wavelength), it is still not possible to ensure the different fading characteristics of signals. Therefore, the conventional method of reducing the correlation between MIMO antennas is useless in the light-of-sight environment, and the method for spatial multiplexing is not suitable for light-of-sight environments.

SUMMARY

The following is an overview of a subject matter described in detail herein. This summary is not intended to limit a scope of the claims.

Embodiments of the disclosure provide a communication method, a terminal, and a communication system, which can perform downlink spatial multiplexing of signals in a light-of-sight environment.

An embodiment of the disclosure provides a communication method applied between a terminal and a base station in a light-of-sight communication environment, including: arranging, on the terminal, a first polarized antenna with same polarity as a second polarized antenna of the base station, wherein the first polarized antenna includes a first antenna component and a second antenna component with different polarities; and receiving, by the first polarized antenna, a first signal and a second signal transmitted by the base station through the second polarized antenna.

In an embodiment, the method further includes: transmitting, by the terminal, a third signal to the base station through the first polarized antenna.

In an embodiment, the transmitting, by the terminal, the third signal to the base station through the first polarized antenna includes: splitting the third signal into two branches and transmitting the two branches to the base station through the first antenna component and the second antenna component, respectively.

In an embodiment, the first polarized antenna includes a linearly polarized antenna or a circularly polarized antenna.

In an embodiment, in a case where the first polarized antenna is the linearly polarized antenna, the first antenna component is orthogonally polarized with the second antenna component, and the arrangement of the first antenna component and the second antenna component includes any one of the following: an angle between the first antenna component and a horizontal plane is +45°, and an angle between the second antenna component and the horizontal plane is −45°; and the first antenna component is parallel to the horizontal plane and the second antenna component is perpendicular to the horizontal plane.

An embodiment of the disclosure further provides a communication method applied between a terminal and a base station in a light-of-sight communication environment, including: arranging a first polarized antenna and a second polarized antenna at the terminal and the base station, respectively, wherein the first polarized antenna includes a first and a second antenna components with different polarities, the second polarized antenna includes a third and a fourth antenna components with different polarities, and wherein the polarity of the first antenna component is same with the polarity of the third antenna component, and the polarity of the second antenna component is same with the polarity of the fourth antenna component; transmitting, by the base station, a first signal and a second signal to the terminal through the third antenna component and the fourth antenna component of the second polarized antenna, respectively; and receiving, by the terminal, the first signal and the second signal transmitted by the second polarized antenna of the base station through the first antenna component and the second antenna component of the first polarized antenna.

An embodiment of the disclosure further provides a terminal applied in a light-of-sight communication environment, including: a first polarized antenna with a same polarity as a second polarized antenna of a base station, wherein the first polarized antenna includes a first antenna component and a second antenna component which are configured to receive a first signal and a second signal transmitted by the base station.

In an embodiment, the terminal further includes: a signal processing module configured to process the first signal and the second signal received by the first antenna component and the second antenna component.

In an embodiment, the first antenna component and the second antenna component are further configured to transmit a third signal to the base station.

In an embodiment, the terminal further includes: a signal split module configured to split the third signal into two branches and the two branches are transmitted to the base station through the first antenna component and the second antenna component, respectively.

In an embodiment, the first polarized antenna includes a linear polarized antenna or a circular polarized antenna.

An embodiment of the disclosure further provides a communication system applied in a light-of-sight communication environment, including a base station and at least one terminal, wherein the base station includes a second polarized antenna including a third and a fourth antenna components with different polarities, and the third antenna component and the fourth antenna component are configured to transmit a first signal and a second signal to each of the at least one terminal, respectively; and each of the at least one terminal includes a first polarized antenna including a first and a second antenna components with different polarities, wherein the polarity of the first antenna component is same with the polarity of the third antenna component, and the polarity of the second antenna component is same with the polarity of the fourth antenna component, and the first antenna component and the second antenna component are configured to receive the first signal and the second signal transmitted from the base station, respectively.

In an embodiment, the terminal includes an airborne station.

Beneficial effects of the embodiments of the disclosure

The communication method, the terminal and the communication system provided in the embodiments of the disclosure take advantage of a situation that the signal polarization characteristics are well maintained since there is few multipath signals reflected, refracted and diffracted in the light-of-sight environment, and arrange polarization antennas with same polarity at the terminal and the base station for transmitting and receiving signals, such that the signals can be received at the terminal merely by an antenna component with same polarity as an antenna component of the base station. Thereby, a scenario of MIMO direct communication channel is formed, and a probability of spatial division multiplexing in the light-of-sight environment is greatly improved, thus improving the downlink throughput and capacity of air-to-ground communications.

Other aspects can be understood after reading and understanding the drawings and detailed description.

DETAILED DESCRIPTION

The disclosure will be further described in detail below with reference to detailed description in conjunction with accompanying drawings.

Since differences in fading characteristics of multipath signals cannot be guaranteed in a light-of-sight communication environment, spatial division multiplexing of signals by using a conventional method of increasing antenna spacing to reduce a correlation between antennas cannot be realized. Therefore, embodiments of the disclosure provide a signal transmission method to realize spatial division multiplexing in the light-of-sight environment. In the light-of-sight environment, signals are rarely reflected, refracted, and diffracted, so that the signal transmission path is not change, and thus the polarization characteristics of the signals are well maintained. Accordingly, arranging polarization antennas with same polarity at the terminal and the base station for transmitting and receiving signals may enable signals received at the terminal merely by an antenna component with same polarity as an antenna component of the base station. Thereby, a scenario of MIMO direct communication channel is formed, and a probability of spatial division multiplexing in the light-of-sight environment is greatly improved.

Embodiment 1

Figure 1:
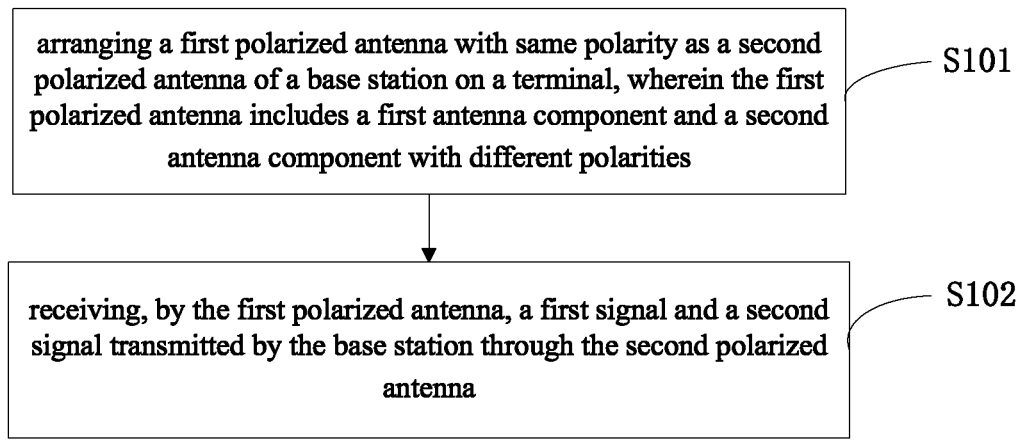
FIG. 1 is a schematic diagram of a communication method according to Embodiment 1 of the disclosure.

The present embodiment mainly explains related steps performed by a terminal in a process of implementing the above-mentioned concept. Refer to FIG. 1 for specific details.

At step S101, arranging, on a terminal, a first polarized antenna with same polarity as a second polarized antenna of a base station, wherein the first polarized antenna includes a first and a second antenna components with different polarities.

At step S102: receiving, by the first polarized antenna, a first signal and a second signal transmitted by the base station through the second polarized antenna.

In conventional methods, the antenna arranged at the terminal is generally an omnidirectional antenna, but it is difficult to realize space division multiplexing in a light-of-sight environment. Therefore, in the present embodiment, a change is made in the terminal and a polarized antenna is arranged on the terminal, such that a channel between the first polarized antenna of the terminal and the second polarized antenna arranged on the base station is similar to a direct communication channel.

Figure 2:
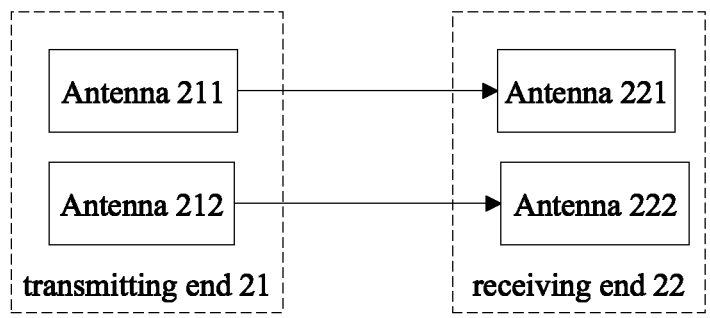
FIG. 2 is a schematic diagram of a MIMO direct communication channel.

FIG. 2 is a schematic diagram of a MIMO direct communication channel. A channel between an antenna 211 and an antenna 221 is a first channel, and a channel between an antenna 212 and an antenna 222 is a second channel. A signal transmitted by the antenna 211 of a transmitting end 21 can be received merely by the antenna 221 at a receiving end 22. Similarly, the antenna 222 of the receiving end 22 can merely receive signals transmitted by the antenna 212 of the transmitting end 21. That is, a signal transmitted by a certain antenna of the terminal 21 has a dedicated channel thereof, such that it can reach a dedicated antenna of the receiving end and would not be received by other antennas.

In the present embodiment, the first polarized antenna may include a circular polarized antenna or a linear polarized antenna. In a case where the arranged first polarized antenna is the circular polarized antenna, accordingly, a first antenna component of the first polarized antenna may be a left-hand polarized antenna, and a second antenna component of the first polarized antenna may be a right-hand circularly polarized antenna. In a case where the arranged first polarized antenna is the linear polarized antenna, there may be multiple options for the first antenna component and the second antenna component as long as the first antenna component and the second antenna component are orthogonally polarized. From the perspective of engineering practice, a commonly used manner is that the first antenna component and the second antenna component are arranged with an angle of +45° and an angle of −45° to a horizontal plane, respectively, or the first antenna component is parallel to the horizontal plane and the second antenna component is perpendicular to the horizontal plane.

In order to form a direct channel, a polarity of the first polarized antenna arranged at the terminal should be certainly same with a polarity of the second polarized antenna arranged at the base station. Therefore, in a case where the second polarized antenna of the base station is the linearly polarized antenna and two antenna components of the second polarized antenna are arranged with an angle of +45° and an angle of −45° to the horizontal plane, respectively, the first antenna component and the second antenna component of the terminal can merely be arranged with angles of +45° and −45° to the horizontal plane, respectively. In a case where the second polarization antenna of the base station is the circular polarization antenna, the first polarization antenna arranged at the terminal can merely be the circular polarization antenna, and the first antenna component and the second antenna component can merely be the left-hand circularly polarized antenna and the right-hand circularly polarized antenna, respectively.

The terminal receives, by using the first antenna component of the first polarized antenna, a first signal transmitted by the base station through the second polarized antenna, and receives, by using the second antenna component of the first polarized antenna, a second signal transmitted by the base station through the second polarized antenna.

After receiving the first signal and the second signal transmitted by the base station, the terminal may also perform corresponding processing on the received signals.

In an uplink process, a third signal transmitted by the first antenna component of the first polarized antenna of the terminal can be received merely by an antenna component, having same polarity as the first antenna component, of the second antenna of the base station. Since transmission power of the terminal is generally low, transmit diversity is generally adopted by the terminal to improve a quality of the received signals, in order to improve an accuracy of determination of the received signal by the base station. Diversity technology may be used to compensate for fading channel loss, such as, it usually takes advantage of the uncorrelated nature of independent samples of the same signal in a wireless propagation environment, and combine certain signals to improve the quality of the received signals, thus resisting adverse effects caused by fading. Therefore, the disclosure also provides an embodiment, wherein the terminal may split a third signal into two branches before transmitting the third signal, and then transmit the two branches through the first antenna component and the second antenna component, respectively, such that, both of the two antenna components of the second polarized antenna on the base station can receive the third signal. In the present embodiment, specific implementation includes: connecting each of the first antenna component and the second antenna component of the first polarized antenna to a power splitter, respectively, passing the third signal through the power splitter before the terminal transmitting the third signal to the base station, and then transmitting two signals output from the power splitter through the first antenna component and the second antenna component, respectively. It can be understood that, in the present embodiment, signal splitting is not necessarily implemented by the power splitter, but may also be implemented by other devices.

Embodiment 2

Figure 3:
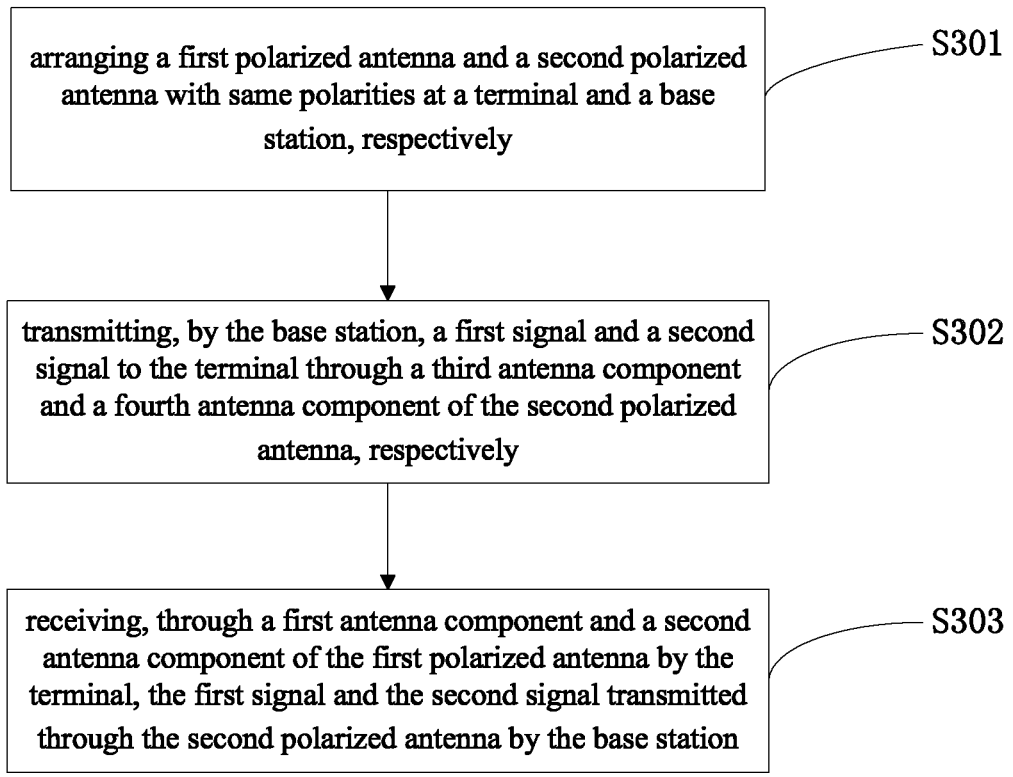
FIG. 3 is a schematic diagram of a communication method according to Embodiment 2 of the disclosure.

The present embodiment fully describes the process of implementing the disclosure from both sides of a terminal and a base station. Refer to FIG. 3 for specific details.

At step S301, arranging a first polarized antenna and a second polarized antenna with same polarities at a terminal and a base station, respectively. That is, arranging the first polarized antenna at the terminal and arranging the second polarized antenna at the base station, wherein a polarity of the first polarized antenna is same with a polarity of the second polarized antenna.

At step S302, the base station transmits a first signal and a second signal to the terminal through a third antenna component and a fourth antenna component of the second polarized antenna, respectively. That is, the base station transmits the first signal through the third antenna component of the second polarized antenna to the terminal, and transmits the second signal through the fourth antenna component of the second polarized antenna to the terminal.

At step S303, the terminal receives, through a first antenna component and a second antenna component of the first polarized antenna, the first signal and the second signal transmitted through the second polarized antenna by the base station.

That is, the terminal receives, through the first antenna component of the first polarized antenna, the first signal transmitted through the second polarized antenna by the base station, and receives, through the second antenna component of the first polarized antenna, the second signal transmitted through the second polarized antenna by the base station.

The first polarized antenna includes the first and second antenna components with different polarities, the second polarized antenna includes the third and fourth antenna components with different polarities. Since polarities of the first polarized antenna is same with the second polarized antenna, the polarity of the first antenna component is same with the polarity of the third antenna component, and the polarity of the second antenna component is same with the polarity of the fourth antenna component.

In the present embodiment, the first polarized antenna may include a circular polarized antenna or a linear polarized antenna. In a case where the arranged first polarized antenna is the circular polarized antenna, the first antenna component and the third antenna component may be a left-hand polarized antenna, accordingly, the second antenna component and the fourth antenna component may be a right-hand circularly polarized antenna. In a case where the arranged first polarized antenna is the linear polarized antenna, there may be multiple options for the first antenna component and the second antenna component as long as the first antenna component and the second antenna component are orthogonally polarized. In engineering practice, a commonly used manner is that the first antenna component and the second antenna component are arranged with an angle of +45° and an angle of −45° to a horizontal plane, respectively, or the first antenna component is parallel to the horizontal plane and the second antenna component is perpendicular to the horizontal plane.

The first and second signals are transmitted through the two antenna components of the second polarized antenna, respectively. In the embodiment, the first polarized antenna and the second polarized antenna are linear polarized antennas. The first antenna component and the second antenna component are orthogonally polarized, and the first antenna component and the second antenna component are arranged with an angle of +45° and an angle of −45° to the horizontal plane, respectively, while the third antenna component and the fourth antenna component are also arranged with an angle of +45° and an angle of −45° to the horizontal plane, respectively, thus the first antenna component is merely used to receive the first signal transmitted by the third antenna component, and the second antenna component is merely used to receive the second signal transmitted by the fourth antenna component.

Additionally, in the uplink process, a third signal transmitted by the first antenna component of the first polarized antenna of the terminal can be received merely by the third antenna component, having same polarity as the first antenna component, of the second polarized antenna of the base station. Since transmission power of the terminal is generally low, transmit diversity is generally adopted by the terminal to improve a quality of received signals, in order to improve an accuracy of determination of the received signal by the base station. Diversity technology may be used to compensate for fading channel loss, such as, it usually takes advantage of the uncorrelated nature of independent samples of the same signal in a wireless propagation environment, and combine certain signals to improve the quality of the received signals, thus resisting adverse effects caused by fading. Therefore, the terminal may split the third signal into two branches before transmitting the third signal, and then transmit the two branches through the first antenna component and the second antenna component, respectively. In the present embodiment, specific implementation includes: connecting each of the first antenna component and the second antenna component of the first polarized antenna to a power splitter, respectively, passing the third signal through the power splitter before the terminal transmitting the third signal to the base station, and then transmitting two signals output from the power splitter through the first antenna component and the second antenna component, respectively.

Therefore, when the base station receives the third signal transmitted by the terminal through the first polarized antenna, the third signal is received by both of the antenna components of the second polarized antenna. Then, the base station combines the signals received by the third antenna component and the fourth antenna component to obtain the third signal. Thereby, the strength of the third signal received by the base station is improved for correcting determination of the received signal by the base station.

An embodiment of the disclosure further provides a computer-readable storage medium storing computer-executable instructions for executing any one of the methods described above.

Embodiment 3

Figure 4:
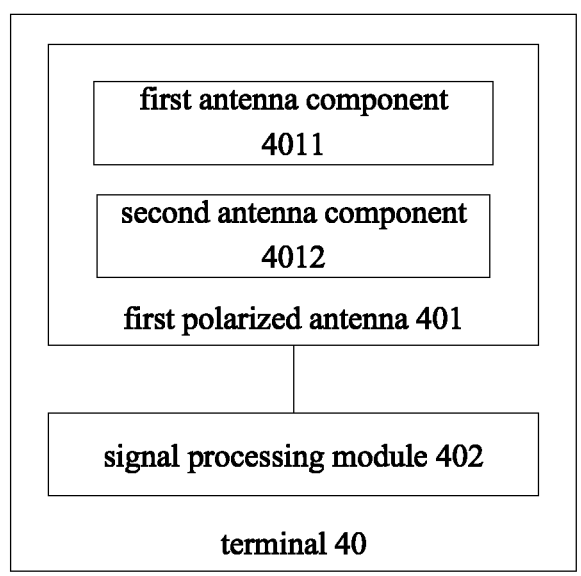
FIG. 4 is a schematic structural diagram of a terminal according to Embodiment 3 of the disclosure.

The present embodiment provides a terminal 40 including a first polarized antenna 401. The terminal 40 may further include a signal processing module 402, as shown in FIG. 4.

A polarity of the first polarized antenna 401 is same with a polarity of a second polarized antenna of the base station. The first polarized antenna 401 includes a first antenna component 4011 and a second antenna component 4012.

In the present embodiment, the first polarized antenna 401 may include a circular polarized antenna or a linear polarized antenna. In a case where the arranged first polarized antenna 401 is the circular polarized antenna, accordingly, the first antenna component 4011 of the first polarized antenna 401 may be a left-hand polarized antenna, and the second antenna component 4012 of the first polarized antenna 401 may be a right-hand circularly polarized antenna. In a case where the first polarized antenna 401 is the linear polarized antenna, there may be multiple options for the first antenna component 4011 and the second antenna component 4012 as long as the first antenna component 4011 and the second antenna component 4012 are orthogonally polarized. From the perspective of engineering practice, a commonly used manner is that the first antenna component 4011 and the second antenna component 4012 are arranged with an angle of +45° and an angle of −45° to a horizontal plane, respectively, or the first antenna component 4011 is parallel to the horizontal plane and the second antenna component 4012 is perpendicular to the horizontal plane.

In order to form a direct channel, the polarity of the first polarized antenna arranged at the terminal should be same with the polarity of the second polarized antenna arranged at the base station. Therefore, in a case where the second polarized antenna of the base station is the linearly polarized antenna and two antenna components of the second polarized antenna are arranged with an angle of +45° and an angle of −45° to the horizontal plane, respectively, the first polarized antenna 401 of the terminal 40 can merely be the linearly polarized antenna, antenna components of which are arranged with an angle of +45° and −45° to the horizontal plane, respectively.

The first polarized antenna 401 is configured to receive the first signal and the second signal transmitted by the base station, wherein the first signal transmitted through the second polarized antenna by the base station is received through the first antenna component 4011, and the second signal transmitted through the second polarized antenna by the base station is received through the second antenna component 4012.

The signal processing module 402 of the terminal 40 is configured to process the received signal.

Figure 5:
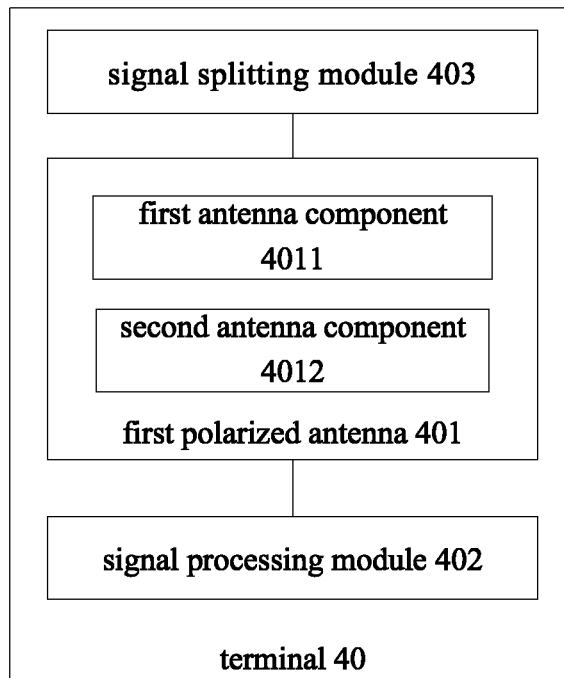
FIG. 5 is a schematic structural diagram of another terminal according to Embodiment 3 of the disclosure.

In the uplink process, a third signal transmitted by the first antenna component 4011 of the first polarized antenna 401 of the terminal can be received merely by an antenna component, having same polarity as the first antenna component 401, of the second antenna of the base station. Since transmission power of the terminal 40 is generally low, the disclosure further provides an embodiment in order to improve an accuracy of determination of the received signals by the base station. In the present embodiment, transmit diversity is adopted by the terminal to improve a quality of the received signals. Diversity technology may be used to compensate for fading channel loss, such as, it usually takes advantage of the uncorrelated nature of independent samples of the same signal in a wireless propagation environment, and combine certain signals to improve the quality of the received signals, thus resisting the adverse effects caused by fading. As shown in FIG. 5, the terminal 40 includes a signal splitting module 403 necessary for implementing transmit diversity, in addition to the first polarized antenna 401 and the signal processing module 402 for implementing space division multiplexing. The signal splitting module 403 is configured to split a third signal into two branches before transmitting the third signal, and then the two branches are transmitted through the two antenna components of the first polarized antenna 401, respectively, such that both of the two antenna components of the second polarized antenna on the base station side can receive the third signal. Specifically, the signal distribution module 403 may be a power splitter, and the specific implementation includes: connecting the first antenna component 4011 and the second antenna component 4012 of the first polarized antenna 401 to the power splitter, respectively; passing the third signal through the power splitter before the terminal 40 transmitting the third signal to the base station; and then transmitting two signals output from the power splitter through the first antenna component 4011 and the second antenna component 4012, respectively.

Embodiment 4

Figure 6:
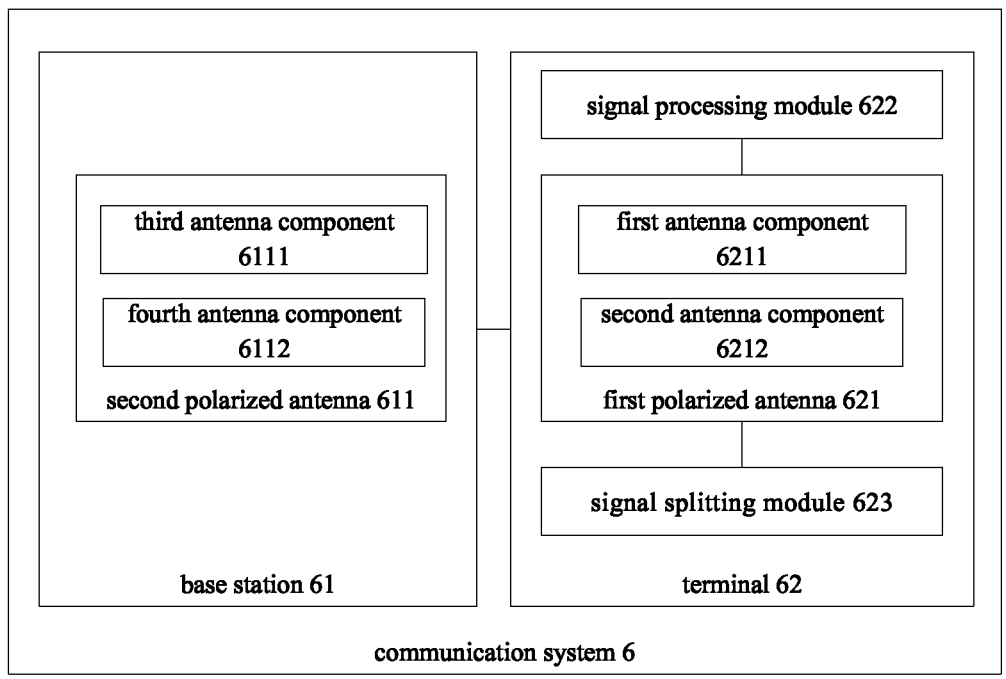
FIG. 6 is a schematic structural diagram of a communications system according to Embodiment 4 of the disclosure.

The present embodiment provides a communication system 6 including a base station 61 and at least one terminal 62, as shown in FIG. 6.

The base station 61 includes a second polarized antenna 611. The second polarized antenna 611 includes a third antenna component 6111 and a fourth antenna component 6112 with different polarities. The third antenna component 6111 and the fourth antenna component 6112 are configured to transmit a first signal and a second signal to the terminal 62, respectively.

The terminal 62 includes a first polarized antenna 621. The first polarized antenna 621 includes a first antenna component 6211 and a second antenna component 6212 with different polarities. A polarity of the first antenna component 6211 is same with the polarity of the third antenna component 6111, and a polarity of the second antenna component 6211 is same with the polarity of the fourth antenna component 6112. The first antenna component 6211 and the second antenna component 6212 are configured to receive a first signal and a second signal transmitted by the base station 61, respectively.

In the present embodiment, the first polarized antenna 621 and the second polarized antenna 611 may include a circular polarized antenna or a linear polarized antenna. In a case where the arranged first polarized antenna 621 and the second polarized antenna 611 are circular polarized antennas, the first antenna component 6211 and the third antenna component 6111 may be left-hand polarized antennas, and accordingly, the second antenna component 6212 and the fourth polarized antenna 6112 may be right-hand circularly polarized antennas. In a case where the arranged first polarized antenna 621 and the second polarized antenna 611 are linear polarized antennas, there may be multiple options for the first antenna component 6211 and the second antenna component 6212 as long as the first antenna component 6211 and the second antenna component 6212 are orthogonally polarized. In engineering implementation, a commonly used manner is that the first antenna component 6211 and the second antenna component 6212 are arranged with an angle of +45° and an angle of −45° to a horizontal plane, respectively, or the first antenna component 6211 is parallel to the horizontal plane and the second antenna component 6212 is perpendicular to the horizontal plane.

The first signal and the second signal are transmitted through the two antenna components of the second polarized antenna 611, respectively. In the present embodiment, the first polarized antenna 621 and the second polarized antenna 611 are linear polarized antennas, and the first antenna component 6211 and the second antenna component 6212 are orthogonally polarized, and the first antenna component 6211 and the second antenna component 6212 are arranged with an angle of +45° and an angle of −45° to the horizontal plane, respectively, while the third antenna component 6111 and the fourth antenna component 6112 are also arranged with an angle of +45° and an angle of −45° to the horizontal plane, respectively, thus the first antenna component 6211 is merely used to receive the first signal transmitted by the third antenna component 6111, and the second antenna component 6212 is merely used to receive the second signal transmitted by the fourth antenna component 6112.

The terminal 62 also includes a signal processing module 622 configured to process the received first signal and second signal.

Additionally, in the uplink process, a third signal transmitted by the first antenna component 6211 of the first polarized antenna 621 can be received merely by the third antenna component 6111, having same polarity as the first antenna component 6211, of the second antenna 611. Since transmission power of the terminal 62 is generally low, transmit diversity is generally adopted by the terminal 62 to improve a quality of received signals, in order to improve an accuracy of determination of the received signals by the base station 61. Diversity technology may be used to compensate for fading channel loss, such as, it usually takes advantage of the uncorrelated nature of independent samples of the same signal in a wireless propagation environment, and combine certain signals to improve the quality of the received signals, thus resisting adverse effects caused by fading. Therefore, the terminal 62 included in the communication system 6 provided in the present embodiment may further includes a signal distribution module 623. The signal distribution module 623 splits a third signal into two branches before transmitting the third signal. Then the two branches are transmitted through the two antenna components of the first polarized antenna 621, respectively. Specifically, the signal distribution module 403 may be a power splitter, and the specific implementation includes: connecting the first antenna component 6211 and the second antenna component 6212 of the first polarized antenna 621 to the power splitter, respectively; passing the third signal through the power splitter before the terminal 62 transmitting the third signal to the base station; and then transmitting two signals output from the power splitter through the first antenna component 6211 and the second antenna component 6212, respectively.

Therefore, when the base station 61 receives the third signal transmitted by the terminal through the first polarized antenna 621, the third signal is received by both of the antenna components of the second polarized antenna 611. Then, the base station 61 combines the signals received by the third antenna component 6111 and the fourth antenna component 6112 to obtain the third signal with better signal quality. Thereby, the strength of the third signal received by the base station 61 is improved for correcting determination of the received signal by the base station 61.

In the present embodiment, the terminal 62 may include an airborne station. The airborne station herein refers to a communication device provided on a high-altitude flight device, such as an aircraft. In a case where the terminal 62 is the airborne station, a probability of spatial division multiplexing in the air-to-ground communication environment can be greatly improved, thus improving the downlink throughput and capacity of air-to-ground communications, which may be of great significance to employment and performance improvement for air-to-ground communications.

A person of ordinary skill in the art can understand that, all or some of the steps in the above method can be implemented by instructing related hardware (e.g., a processor) via a program. The program can be stored in a computer-readable storage medium such as a read-only memory, a magnetic disk, or a compact disk. Optionally, all or some of the steps of the above embodiments may also be implemented with one or more integrated circuits. Consequently, each module/unit in the above embodiments may be implemented in a form of hardware, for example, realizing its corresponding function by an integrated circuit, or may also be implemented in a form of a software module, for example, realizing its corresponding function by executing programs/instructions stored in a storage. The disclosure is not limited to any specific form of combination of hardware and software.

The above content is a further detailed description of the disclosure with reference to detailed descriptions, and it cannot be assumed that the specific implementation of the disclosure is limited to above descriptions. For a person of ordinary skill in the art to which the disclosure belongs, a number of simple deductions or replacements can be made without departing from the concept of the disclosure should all be considered as falling into the protection scope of the disclosure.

What is claimed is:

1. A communication method applied between a terminal and a base station in a light-of-sight communication environment, comprising:
    arranging, on the terminal, a first polarized antenna with same polarity as a second polarized antenna of the base station, wherein the first polarized antenna comprises a first antenna component and a second antenna component with different polarities;
    receiving, by the first polarized antenna, a first signal and a second signal transmitted by the base station through the second polarized antenna; and
    transmitting, by the terminal, a third signal to the base station through the first polarized antenna,
    wherein the transmitting, by the terminal, the third signal to the base station through the first polarized antenna comprises:
    splitting the third signal into two branches and transmitting the two branches to the base station through the first antenna component and the second antenna component, respectively.

2. The communication method according to claim 1, wherein the first polarized antenna comprises a linearly polarized antenna or a circularly polarized antenna.

3. The communication method according to claim 2, wherein, in a case where the first polarized antenna is the linearly polarized antenna, the first antenna component and the second antenna component are orthogonally polarized, and the arrangement of the antenna component and the second antenna component comprises any one of the following:
    an angle between the first antenna component and a horizontal plane is +45°, and an angle between the second antenna component and the horizontal plane is −45°; and
    the first antenna component is parallel to the horizontal plane and the second antenna component is perpendicular to the horizontal plane.

4. A communication method applied between a terminal and a base station in a light-of-sight communication environment, comprising:
    arranging a first polarized antenna and a second polarized antenna on the terminal and the base station, respectively, wherein the first polarized antenna comprises a first antenna component and a second antenna component with different polarities, the second polarized antenna comprises a third antenna component and a fourth antenna component with different polarities, and wherein a polarity of the first antenna component is same with a polarity of the third antenna component, and a polarity of the second antenna component is same with a polarity of the fourth antenna component;
    transmitting, by the base station, a first signal and a second signal to the terminal through the third antenna component and the fourth antenna component of the second polarized antenna, respectively; and
    receiving, through the first antenna component and the second antenna component of the first polarized antenna by the terminal, the first signal and the second signal transmitted through the second polarized antenna by the base station.

5. A terminal applied in a light-of-sight communication environment, comprising:
    a first polarized antenna with same polarity as a second polarized antenna of a base station, wherein the first polarized antenna comprises a first antenna component and a second antenna component configured to receive a first signal and a second signal transmitted by the base station and transmit a third signal to the base station; and
    a signal split module configured to split the third signal into two branches and transmit the two branches to the base station through the first antenna component and the second antenna component, respectively.

6. The terminal of claim 5, further comprising:
    a signal processing module configured to process the first signal and the second signal received by the first antenna component and the second antenna component.

7. The terminal according to claim 5, wherein the first polarized antenna comprises a linearly polarized antenna or a circularly polarized antenna.

8. A communication system applied in a light-of-sight communication environment, comprising a base station and at least one terminal according to claim 5, wherein
    the base station comprises a second polarized antenna comprising a third antenna component and a fourth antenna component with different polarities, and the third antenna component and the fourth antenna component are configured to transmit a first signal and a second signal to each of the at least one terminal, respectively; and
    for each of the at least one terminal, the first antenna component and the second antenna component have different polarities, a polarity of the first antenna component is same with a polarity of the third antenna component, and a polarity of the second antenna component is same with a polarity of the fourth antenna component.

9. The communication system of claim 8, wherein the at least one terminal comprises an airborne station.

10. The communication system of claim 8, wherein each of the at least one terminal further comprises:
    a signal processing module configured to process the first signal and the second signal received by the first antenna component and the second antenna component.

11. The communication system of claim 8, wherein for each of the at least one terminal, the first antenna component and the second antenna component are further configured to transmit a third signal to the base station.

12. The communication system of claim 11, wherein each of the at least one terminal further comprises: a signal split module configured to split the third signal into two branches and transmit the two branches to the base station through the first antenna component and the second antenna component, respectively.

13. The communication system of claim 8, wherein for each of the at least one terminal, the first polarized antenna comprises a linearly polarized antenna or a circularly polarized antenna.

* * * * *